July 7, 1936.  C. E. BENNETT  2,046,364
APPARATUS FOR SHIPPING AND INSTALLING ELECTRIC POWER CABLES
Filed July 19, 1933
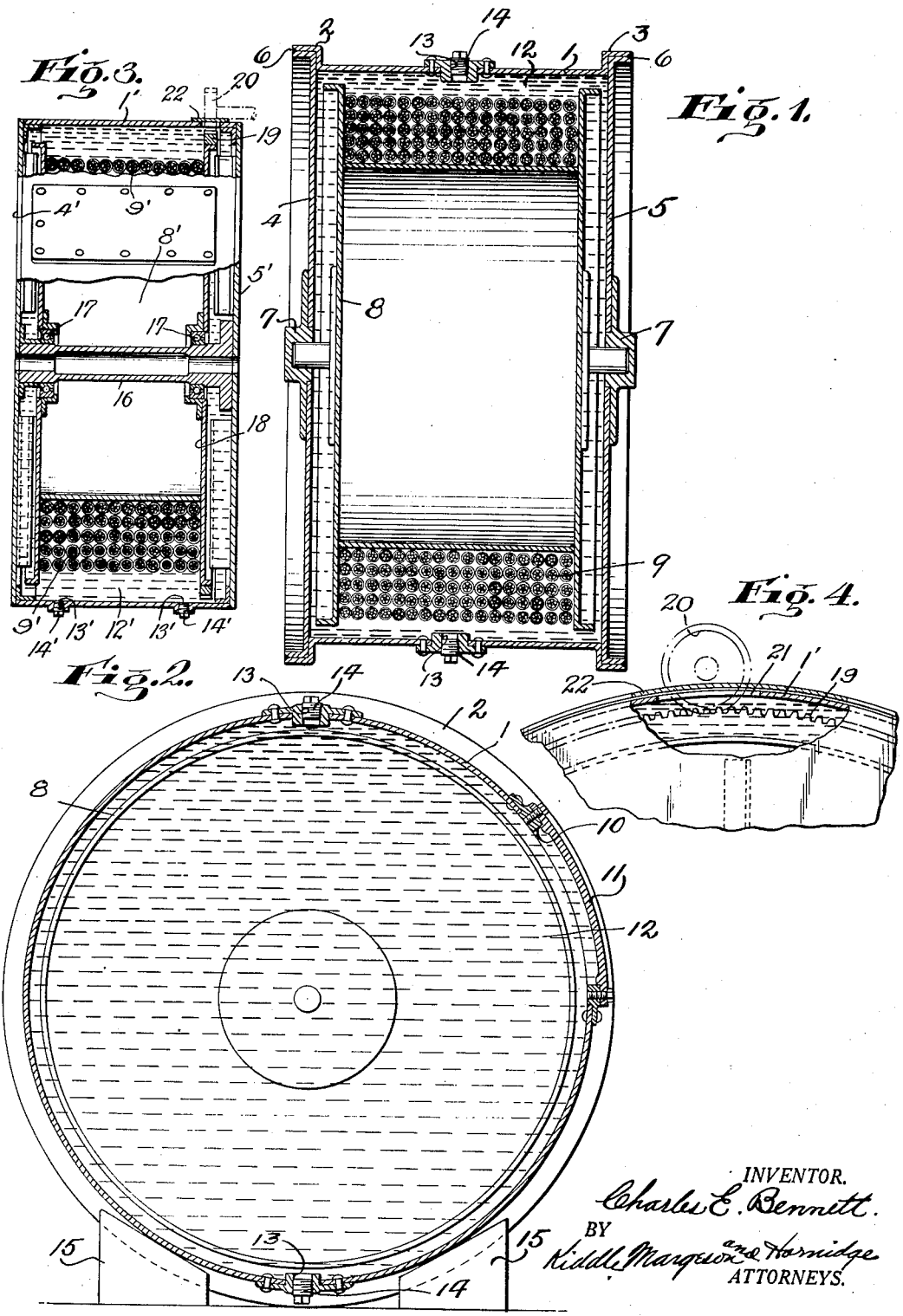
INVENTOR.
Charles E. Bennett.
BY Kiddle, Margeson and Hornidge
ATTORNEYS.

Patented July 7, 1936

2,046,364

UNITED STATES PATENT OFFICE 2,046,364

APPARATUS FOR SHIPPING AND INSTALLING ELECTRIC POWER CABLES

Charles E. Bennett, Hawthorne, N. J., assignor to The Okonite-Callender Cable Company, Paterson, N. J., a corporation of New Jersey Application July 19, 1933, Serial No. 681,144

6 Claims. (Cl. 242—77)

This invention is directed to a method of and apparatus for the shipment of electric cables and is particularly adapted for the shipment of cables such as disclosed in the cable system of my copending application Serial No. 553,714, filed July 29, 1931, now Patent No. 2,015,063 of Sept. 24, 1935.

In my copending application above referred to I disclose a cable system in which the insulated but unsheathed cable conductors are drawn into a pipe line which is maintained filled with oil under high pressure. Inasmuch as the cables are drawn into the pipe line in the field and inasmuch as the cables are impregnated at the factory it has been found necessary heretofore to ship these cables to the installation in lead, that is to say, with the insulated individual conductors enclosed in a temporary lead sheath. This was found desirable in order to protect the cable in transit and to retain the oil or other insulating fluid with which the cable is impregnated within the insulation and to prevent the cable taking up moisture while in transit. It will be understood of course that the ends of the cables in transit are sealed.

Inasmuch as in accordance with the invention of my application aforesaid the conductors of the cable are installed in the pipe line unsheathed, the temporary lead sheath in which the cable is shipped must be removed during installation as of course will be understood.

The present invention provides a method of and apparatus for the shipment of impregnated insulated cables without a lead sheath, the insulated cable, however, being fully protected mechanically and the loss of the impregnating fluid and the entry of moisture or other deleterious material to the cable while in transit avoided. Inasmuch as the cable is shipped without a sheath, I effect a substantial saving in the labor and material involved in applying the sheath at the factory and removing the same in the field.

It also has been found desirable when installing the cable system of my application aforesaid to lubricate the pipe line and cable when drawing the cable into the pipe line. The present invention eliminates this operation inasmuch as the unsheathed cable is shipped in oil as will be brought out hereinafter.

In the drawing accompanying this application:

Fig. 1 is a longitudinal sectional elevational view of an apparatus suitable for the practice of my invention;

Fig. 2 is a cross section of the apparatus of Fig. 1;

Fig. 3 is a longitudinal sectional elevational view of a further embodiment of my invention; and Fig. 4 is a fragmentary part sectional view of Fig. 3.

Referring to the drawing in detail and first of all to Figs. 1 and 2, the improved apparatus therein illustrated comprises a metal container 10 or tank made up of a body portion 1 provided with terminal peripheral flanges 2 and 3 to which are welded end closure members 4 and 5, respectively. The welds are shown at 6 and as will be apparent hermetically seal the container.

Each of the end closure members or heads 4 and 5 is provided with a bearing 7 for the axles of a cable reel 8. As these are closed bearings the necessity of stuffing boxes is eliminated.

The reel 8 which is rotatable in the bearings 7 receives a cable 9 which is reeled thereon and consists of an unsheathed conductor insulated with impregnated insulation such as oil impregnated paper.

The body portion 1 of the container is provided with a handhole, seen in Fig. 2 and designated 10, this handhole being equipped with a cover 11 bolted liquid-tight to the body of the container. The container is provided with filling and draining openings 13 each equipped with a plug 14. In preparing for shipment the container is filled with oil 12, which, if desired, may be maintained under pressure.

The oil filled container is shipped to the job and when the cable is to be installed the container is held steady with chocks 15 and the oil is drained off below the level of the handhole cover 11, whereupon this cover may be removed and the unsheathed cable drawn directly from the reel into the pipe line.

It will be appreciated from the foregoing that my improved apparatus provides for shipment of the insulated oil impregnated but unsheathed cable without danger of loss of the fluid insulation from the cable, without danger of mechanical injury to the cable and without danger of the entry of moisture or other foreign materials to the cable while in transit. It will be appreciated, furthermore, that my invention avoids the necessity of equipping the cable with the expansion tanks now employed where the cable is shipped in a lead sheath, these tanks being necessary for preventing bursting of the sheath due to rises in pressure on account of temperature rises when the cable is in transit.

It will be appreciated also that my improved apparatus eliminates the labor and expense involved in applying a temporary lead sheath to the cable before shipment and the removal of this sheath when installing; avoids the necessity of lubricating the cable as the same is drawn into the pipe line and eliminates the necessity of jacking up the reel on which the cable is wound as is necessary with reels commonly employed in the cable industry.

In the embodiment of my invention as illustrated in Figs. 3 and 4 I again show a container embodying a body portion 1' to which are welded end closure members or heads 4' and 5'. This contained is equipped internally with a hollow axle 16 secured to the heads 4' and 5' by bolting or welding or other suitable means, this shaft being equipped with roller bearings 17 on which is mounted a cable reel 8'.

One of the end flanges 18 of this reel is equipped with a ring gear 19 to permit of driving the reel from the exterior of the container by suitable drive member 20, the body member 1' of the container being provided for this purpose with an opening 21 normally closed by a plate 22, so that the insulated but unsheathed cable 9' can be wound upon and unwound from the reel 8'.

A friction drive may be substituted for the gear drive just described, if desired.

It will be understood that the body 1' is equipped with a handhole as in the embodiment of the invention illustrated in Figs. 1 and 2.

Any suitable brake device may be employed to prevent over-driving when letting off the cable.

As in the embodiment of my invention illustrated in Figs. 1 and 2, the container is filled through filling openings 13' closed by plugs 14' with oil 12'.

This embodiment of my invention, therefore, provides a construction presenting all the advantages pointed out in connection with the apparatus of Figs. 1 and 2. Additionally this construction provides for reeling the cable on the reel with the reel in its container.

From all of the foregoing it will be seen that I have provided a construction for the shipment of cables in which an oil impregnated cable can be shipped without a sheath and be protected against mechanical injury, against loss of oil and against absorption of moisture. It will be apparent also that in all of the forms shown the cable can be drawn directly from the reel into the pipe line, without the delay, labor and expense incident to shipment in a lead sheath, and inasmuch as the cable is drawn directly out of the oil in the container the cable is well lubricated and the danger of moisture absorption during installation reduced to a minimum.

As above mentioned, and aside from the other advantages of my invention, the oil can be drained out of the container in the field and used in the pipe line in which the cable is installed.

What I claim is:—

1. In combination a sealed container, a cable reel within the container, an unsheathed insulated cable conductor on the reel, fluid insulating material under positive pressure filling the space within the container unoccupied by the reel and cable, and means for rotating said reel from the exterior of the container.

2. In combination a sealed container, a cable reel within and supported for rotation by said container, an unsheathed insulated cable conductor on said reel, fluid insulating material under positive pressure filling the space within the container unoccupied by the reel and cable, and means for rotating said reel from the exterior of the container.

3. In combination a sealed container, a cable reel within and supported for rotation by said container, an unsheathed insulated cable conductor on said reel, fluid insulating material under positive pressure filling the space within the container unoccupied by said reel and cable, said container being provided with a handhole for permitting of withdrawal of the insulated conductor from the reel with the reel in place in the container, a fluid-tight cover for said handhole, and means for rotating said reel from the exterior of the container.

4. In combination a sealed container, a cable reel within said container, closed bearings in each end of the container for supporting the reel, an unsheathed insulated cable conductor on said reel, fluid insulating material under positive pressure filling the space within the container unoccupied by the said reel and cable, said container being provided in its wall with a handhole permitting of the withdrawal of the insulated unsheathed conductor from the reel with the reel in place in the container, a cover for said handhole, means for securing the cover to the container fluid-tight, and means for rotating said reel from the exterior of the container.

5. In combination a sealed container, a cable reel mounted for rotation within said container, an unsheathed insulated cable on said reel, fluid insulating material filling the space in the container unoccupied by the reel and cable, and means for rotating said reel from the exterior of the container.

6. In combination a sealed container, a cable reel mounted for rotation within said container, an unsheathed insulated cable on said reel, fluid insulating material filling the space in the container unoccupied by the reel and cable, one end of said reel being provided with a gear accessible from the exterior of the container for rotating said reel.

CHARLES E. BENNETT.

CERTIFICATE OF CORRECTION.

Patent No. 2,046,364.  July 7, 1936.

CHARLES E. BENNETT.

It is hereby certified that the name of the assignee in the above numbered patent was erroneously described and specified as "The Okonite-Callender Cable Company", whereas said name should have been described and specified as The Okonite-Callender Cable Company, Incorporated, of Paterson, New Jersey, a corporation of New Jersey, as shown by the records of assignments in this office; and page 2, first column, line 15, for the word "contained" read container; and that the said Letters Patent should be read with these corrections therein that the same may conform to the record of the case in the Patent Office.

Signed and sealed this 11th day of August, A. D. 1936.

Henry Van Arsdale

Acting Commissioner of Patents.

(Seal)